(12) United States Patent
Augst

(10) Patent No.: US 10,745,049 B2
(45) Date of Patent: Aug. 18, 2020

(54) DEVICE, OPERATING METHOD, AND ELECTRONIC CONTROL UNIT FOR CONTROLLING A VEHICLE WHICH CAN BE DRIVEN IN AN AT LEAST PARTLY AUTOMATED MANNER

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/290,404

(22) Filed: Mar. 1, 2019

(65) Prior Publication Data
US 2019/0193788 A1    Jun. 27, 2019

Related U.S. Application Data

(63) Continuation of application No. PCT/EP2017/070490, filed on Aug. 11, 2017.

(30) Foreign Application Priority Data

Sep. 16, 2016   (DE) .................. 10 2016 217 772

(51) Int. Cl.
  *B62D 15/02*  (2006.01)
  *B62D 5/00*   (2006.01)
  *B60K 28/06*  (2006.01)

(52) U.S. Cl.
  CPC ............ *B62D 15/025* (2013.01); *B60K 28/06* (2013.01); *B62D 5/008* (2013.01); *B62D 15/029* (2013.01); *B62D 15/0265* (2013.01)

(58) Field of Classification Search
  CPC ..... B62D 15/025; B62D 15/029; B62D 5/008
  (Continued)

(56) References Cited

U.S. PATENT DOCUMENTS

| 10,131,375 B2 | 11/2018 | Schmidt et al. |
| 2003/0189493 A1 | 10/2003 | Klausner et al. |

(Continued)

FOREIGN PATENT DOCUMENTS

| DE | 100 27 922 A1 | 1/2002 |
| DE | 10 2004 057 262 A1 | 6/2006 |

(Continued)

OTHER PUBLICATIONS

International Search Report (PCT/ISA/210) issued in PCT Application No. PCT/EP2017/070490 dated Nov. 7, 2017 with English translation (seven (7) pages).

(Continued)

*Primary Examiner* — Yazan A Soofi
(74) *Attorney, Agent, or Firm* — Crowell & Moring LLP

(57) ABSTRACT

An operating element can be operated by a driver for controlling at least the lateral guidance of the vehicle. A wheel angle adjuster is actuated by the operating element of the driver and/or by an electronic control unit that controls the automated lateral guidance of the vehicle so as to adjust a steering angle at the steerable wheels of the vehicle. In the process, a degree of coupling between at least one first part of the operating element and the wheel angle adjuster of the vehicle and/or between at least one first part of the operating element and a fixed position in the coordinate system of the vehicle can be modified depending on the degree of haptic contact between the driver of the vehicle and the aforementioned first part of the operating element.

13 Claims, 1 Drawing Sheet

(58) Field of Classification Search
USPC .......................................................... 701/42
See application file for complete search history.

(56) References Cited

U.S. PATENT DOCUMENTS

| | | | | |
|---|---|---|---|---|
| 2008/0255727 | A1* | 10/2008 | Lee | B62D 15/025 |
| | | | | 701/41 |
| 2012/0296528 | A1 | 11/2012 | Wellhoefer et al. | |
| 2012/0303217 | A1* | 11/2012 | Reichel | B62D 15/0265 |
| | | | | 701/41 |
| 2016/0091083 | A1* | 3/2016 | Drees | B60W 30/182 |
| | | | | 74/473.18 |
| 2016/0200348 | A1* | 7/2016 | Lueke | B62D 1/046 |
| | | | | 701/41 |
| 2016/0280234 | A1* | 9/2016 | Reilhac | B60K 35/00 |
| 2017/0137060 | A1* | 5/2017 | Wanner | B62D 1/166 |
| 2018/0304883 | A1* | 10/2018 | Mueller | B60T 7/12 |

FOREIGN PATENT DOCUMENTS

| | | |
|---|---|---|
| DE | 10 2011 076 174 A1 | 11/2012 |
| DE | 10 2013 010 630 A1 | 1/2015 |
| DE | 10 2013 012 777 A1 | 2/2015 |
| DE | 10 2014 107 195 A1 | 11/2015 |
| DE | 10 2014 216 140 A1 | 2/2016 |
| EP | 2 460 712 A2 | 6/2012 |

OTHER PUBLICATIONS

German-language Written Opinion (PCT/ISA/237) issued in PCT Application No. PCT/EP2017/070490 dated Nov. 7, 2017 (seven (7) pages).
German-language Search Report issued in counterpart German Application No. 10 2016 217 772.9 dated May 30, 2017 with partial English translation (12 pages).

* cited by examiner

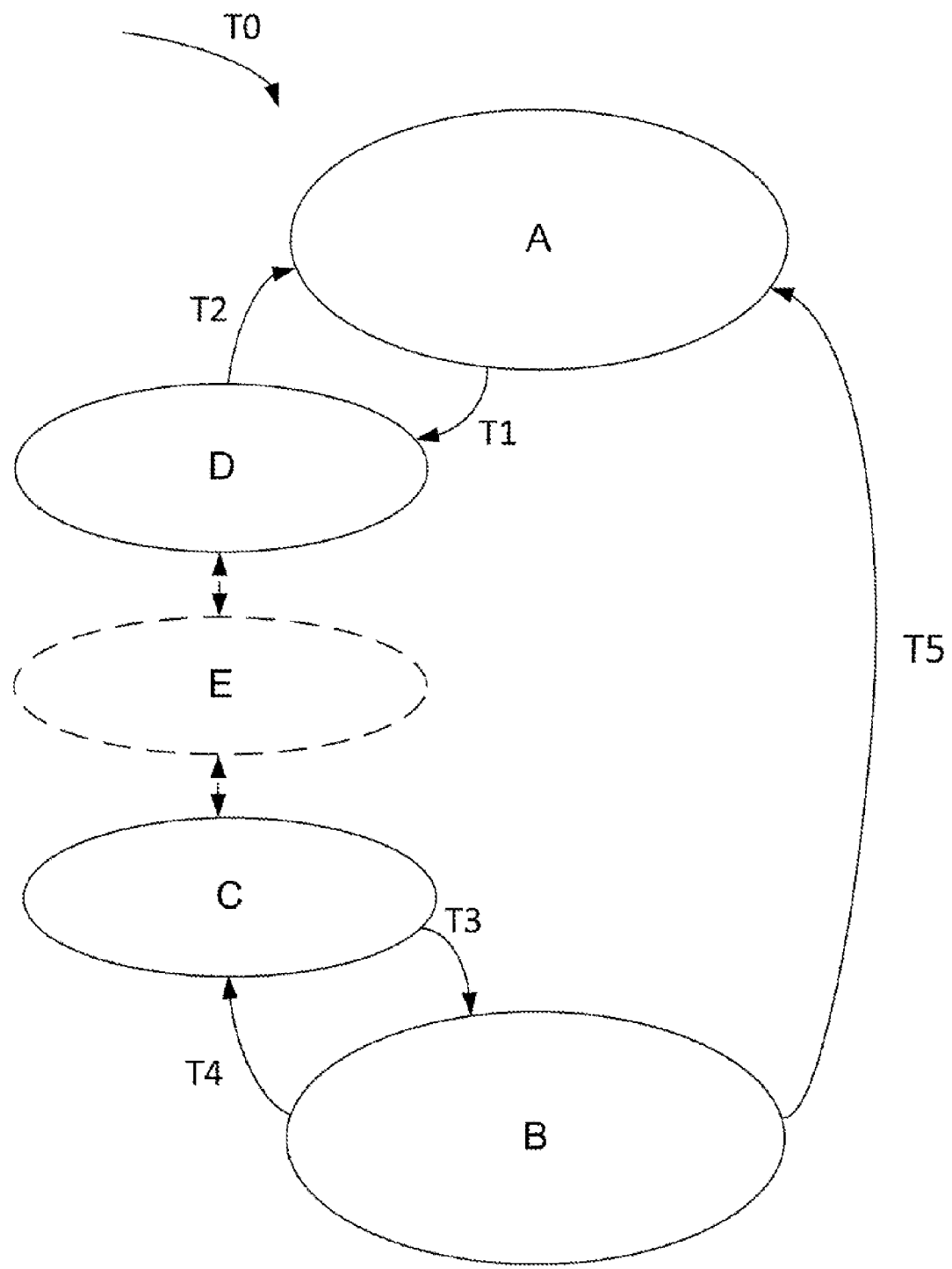

DEVICE, OPERATING METHOD, AND ELECTRONIC CONTROL UNIT FOR CONTROLLING A VEHICLE WHICH CAN BE DRIVEN IN AN AT LEAST PARTLY AUTOMATED MANNER

CROSS REFERENCE TO RELATED APPLICATIONS

This application is a continuation of PCT International Application No. PCT/EP2017/070490, filed Aug. 11, 2017, which claims priority under 35 U.S.C. § 119 from German Patent Application No. 10 2016 217 772.9, filed Sep. 16, 2016, the entire disclosures of which are herein expressly incorporated by reference.

BACKGROUND AND SUMMARY OF THE INVENTION

The invention relates to a device, to an operating method and to a corresponding computer product (as an electronic control unit) for controlling a vehicle which can be driven in an at least partly automated manner. In particular, the invention relates to a steering handle device of a motor vehicle which can be operated (driven) in an at least partly automated manner with regard to the lateral guidance thereof, wherein by way of a driver of the vehicle displacing a steering handle, a steer angle on at least one steerable vehicle wheel can be controlled, in particular can be preset, and wherein, in an automated driving state, the steering handle can be decoupled from a wheel angle actuator actuating the wheel steer angle, whereas in a driving state controlled by the driver of the vehicle, the handle is coupled to the wheel angle actuator in any desired manner, for example mechanically or electronically or electromagnetically, and wherein the steering handle device is designed to perform a switch between an at least partly wheel angle actuator an at least partly decoupled state.

In the present case, an operating method for a device according to the invention is further claimed, having at least one of the method technical features described in the present case and an electronic control unit which can be separate from a vehicle and can be implemented for example in a mobile user device and which is configured to operate a device or steering handle device according to the invention in the manner described in the present case. With regard to the prior art, reference is made by way of example to DE 10 2014 216 140 A1.

The automated or autonomous driving of motor vehicles in road traffic in all known levels, including, in addition to simple driver assistance, partial automation and high-level automation right up to full automation, is becoming increasingly important. In the previously mentioned automation levels, in each case a steering handle (conventionally a steering wheel) is also present, by means of which a person, namely the driver of the motor vehicle, can influence or determine what is known as the lateral dynamic course of the vehicle, i.e. by means of a steering handle, a yawing movement or generally a steering movement, i.e. a movement of the motor vehicle which deviates from driving straight on, is determined. In a more general form, such a steering handle is referred to in the present case as an operating element (at least for controlling the lateral guidance of the vehicle).

In the step mentioned at the outset, a steering wheel (as a steering handle or operating element) or a steering system of a motor vehicle is described in which the steering wheel can be mechanically coupled to, or decoupled from, a wheel angle actuator which ultimately determines the steer angle or toe angle adjusted on at least one steerable wheel of the vehicle. At this point, it should be explicitly mentioned that, in the present case, deviating from this mentioned prior art, what is known as an electronic coupling can also be provided between the steering handle and the wheel angle actuator, i.e. in addition to mechanical steering systems comprising a mechanical connection between the steering handle and the wheel angle actuator, the present invention also relates to the steer-by-wire systems which are known in principle, in which the driver predetermines, by means of their steering handle, a steering wish which can be detected by sensors, which wish is then suitably implemented by means of an electronic transmission from a suitably controllable actuator to the at least one steerable vehicle wheel.

Briefly coming back to the document mentioned at the outset, in that case the driver can displace their steering handle in a substantially axial manner, i.e. either can displace said handle away from them (forwards), by means of which the steering handle is decoupled from the wheel angle actuator, or can pull said handle towards them by a small amount, by means of which the steering handle is ultimately (i.e. indirectly) coupled to the wheel angle actuator. In addition to this known prior art, the driver assistance systems which are almost conventional already are also mentioned as further known prior art, by means of which systems, according to a detection of the environment and an evaluation of the situation around the vehicle, the steering wheel automatically turns and/or optionally is caused to vibrate with a relatively weak force which can be overruled by the driver at any time. Further known is what is known as a "hands-on sensor" on the steering wheel (or generally on the operating element), which can detect whether at least one hand of the driver is on the steering wheel. A "hands-on system" of this type outputs a warning, e.g. what is known as a "takeover request", if the driver lets go of the steering wheel for a certain amount of time in driving maneuvers which are carried out in a partly automated manner. Such a takeover request requests that the driver take over at least the steering of the vehicle.

Even if these known systems already have a relatively high quality and reliability, the driver of the vehicle should still be able to decide safely (and unambiguously) at any time whether they accept a certain driving maneuver which their vehicle performs automatically or whether they would like to prevent or correct said maneuver. This cooperation between firstly the wish of the driver and secondly the behavior of an automatic, electronically controlled system taking over the vehicle lateral guidance takes place in the current prior art by means of the force with which the steering handle or the operating element is actuated by the driver. Therefore the force (or more precisely the momentum) with which the steering wheel is automatically rotated in automated driving maneuvers is selected to be small enough that even a driver who is physically slight or lacking in confidence is not unsettled and can overpower this automatic preset at any time. At the same time, the forces or momentums placed on the steering wheel by a system (implementing an electronic control for example electromechanically) during at least partly automated driving must be selected to be strong enough that the driver does not inadvertently turn or instinctively impede the movement of the steering wheel during an automatic steering process by means of an unintentional movement, for example by their angled leg bumping the steering wheel. In the case of the prior art mentioned at the outset, the last-mentioned problem cannot occur, but in the case of this prior art, a certain amount of time, which may be disproportionately long, can pass between the driver's request to take over the steering themselves and the actual implementation of this request after an axial displacement of the steering wheel towards them.

The problem addressed by the present invention is that of demonstrating a corrective measure for the illustrated problem.

The solution to this problem is characterized in that the degree of the coupling between at least one first part of the operating element and the wheel angle actuator of the vehicle and/or between at least one first part of the operating element and a fixed position in the coordinate system of the vehicle can be, for example, changed according to the measurement of the haptic contact of the driver of the vehicle with the above-mentioned first part of the operating element, thus, for example or in particular, in accordance with a preset logic.

With reference to the steering handle device mentioned further above, to solve the above-mentioned problem, the characteristic of a haptic contact between the driver and the steering handle, even without a displacement thereof as said specific action of the driver, can determine the degree of the coupling between the steering handle and the wheel angle actuator and/or between the steering handle and the vehicle body (as a fixed position in the coordinate system of the vehicle). The degree of the coupling can always include, in addition to a completely coupled state and a completely decoupled state, at least one "intermediate state", which will be described in greater detail later on. It can be said now already that an intermediate state of this type can be dependent on any, for example even preset constraints, in such a way that for example for a steering wheel, within a certain turning angle limit or a certain turning angle range thereof, there can be a coupling between the steering wheel and the wheel angle actuator, whereas outside this certain turning angle limit or this turning angle range, there is no corresponding coupling. (Apart from that, turning angle limits of this type can also exist for the wheel steer angle adjusted on the steerable wheel). Similar can apply to forces or momentums applied to the steering handle or to the operating element, for example in such a way that in the case of small forces or momentums applied by a person (in particular by the driver of the vehicle), there is no coupling, whereas in the case of greater forces or momentums, a coupling is automatically produced between the steering wheel (or generally the operating element) and the wheel angle actuator.

Furthermore, reference is explicitly made once again to the fact that said coupling can be presented in a wide variety of ways, thus in particular mechanically and/or electronically and/or electromagnetically. Reference is further made to the fact that a steering handle within the meaning of the present invention is not necessarily understood to mean a complete operating element, such as is visible for the driver of the vehicle, but optionally only part of an operating element which appears to the driver at first sight as a unit, which part said driver handles when they operate said operating element. Coming back to the most common example today of an operating element for lateral guidance of a vehicle, namely a steering wheel, a steering handle within the meaning of the present description is either only the steering wheel rim, which the driver grasps, or only part of the steering wheel rim, which is conventionally grasped by vehicle drivers. By contrast, for example the spoke or the central hub portion of a steering wheel does not represent a steering handle and does not necessarily have to be part of the steering handle. In fact, a mentioned mechanical coupling can take place for example between the steering wheel rim and the spokes of a steering wheel which is otherwise conventional nowadays, or a corresponding coupling and decoupling option can be provided. Furthermore, a first and a second or additional part of an operating element for controlling at least the lateral guidance of the vehicle are also mentioned, wherein, with respect to a steering wheel, said first part can however be part of the steering wheel rim, whereas a second part of the operating element can be for example the steering wheel spokes or the steering wheel hub.

A steering handle device according to the invention which can comprise for example a steering wheel, but alternatively also a steering rod or a lever in the manner of a joystick or the like as a steering handle (or as an operating element according to the invention), carries virtually no risk of accidental operation (for example as a result of inattentiveness of the driver in a highly automated driving state), since safe and rapid differentiation between a manual, i.e. driver-controlled driving mode and an automatic mode (with control of the vehicle lateral guidance by an electronic control unit) is handled in an intelligent manner. In a device according to the invention, the difference between the driver's wish and the "wish" for a lateral guidance which can be performed automatically must therefore not be decided by means of the size of the steering moment or applied forces (as is conventional in the current prior art). In fact, an intelligent cooperation between the driver and a system for at least partly automated drivers can take place at least partly by means of the type and characteristic or a measurement of the haptic contact between the driver and the steering handle or at least a first part of the operating element for vehicle lateral guidance.

For example, a sensor on the steering handle (or on the at least first part of the operating element), thus for example a hands-on sensor which is known in principle, can detect that the driver has not placed either of their hands on the steering handle and thus is not clasping said handle in accordance with predetermined criteria, that is to say for example is not clasping said handle in a sufficiently extensive or sufficiently firm manner. As a consequence of such an assessment that any haptic contact is insufficient or unsuitable and/or that the measurement of the haptic contact is already considerably decreasing, the device according to the invention causes the coupling between the steering handle and ultimately the wheel angle actuator to at least decrease or at least partly open, if not completely break up (in the sense of a decoupling). Preferably in association therewith, the driving mode is then switched to an automated driving mode in which the wheel angle actuator is suitably controlled by an electronic control unit. Preferably, for such an assessment, with respect to the measurement of the haptic contact, multiple degrees of the haptic contact which are extremely different in principle are detected and taken into account, thus for example whether the steering handle is grasped by the driver with only one hand, which in an electronic control unit of a steering handle device according to the invention can be classified for example as an insufficient characteristic for the driver to take over the guidance of the vehicle, or is grasped by the driver with two hands, which can be classified for example as a sufficient characteristic for the driver to take over the guidance of the vehicle. To that effect, it is also possible to differentiate as to whether the steering handle is for example being gripped or whether a predetermined minimum force (in particular a compressive force per unit area) is being applied thereto (=sufficient characteristic for the driver to take over guidance of the vehicle), or whether something, for example the driver's leg, is merely in simple abutting contact with the steering handle. The latter is an example of an insufficient characteristic of the haptic contact with regard to the driver taking over the guidance of the vehicle or with regard to the driver wishing to take over, which then is consequently not followed. The characteristic in each case of the haptic contact can however also consist in the points of the steering handle at which there is contact, and in particular can also be dependent on the force or strength of the haptic contact. To further develop the latter, the pressure distribution on the steering handle or a pressure distribution pattern on the steering handle can be a preferred measurement for the characteristic of the haptic contact, wherein a steering handle is understood to be in particular the region of a general control means (for the lateral guidance of the vehicle by the driver) which the driver regularly grasps for control. In the case of a steering wheel, this is thus actually only the steering wheel rim, i.e. to be precise, in the case of a steering wheel, the rim thereof which represents the steering handle or a mentioned at least first part of the operating element for lateral guidance.

The characteristic of the haptic contact between the driver and the steering handle is thus detected using suitable sensors and evaluating the signals thereof in an electronic control unit which consequently reacts suitably according to the detected characteristic (of the haptic contact), i.e. in particular suitably adjusts, or adjusts as recorded, the degree of the coupling between the steering handle and the wheel angle actuator and/or between the steering handle (or the first part of the lateral guidance operating element) and the vehicle body (or of the chassis frame or parts of the vehicle which are stationary relative to a vehicle-fixed coordinate system) based on suitable specifications. Furthermore, this just-mentioned control unit can also prompt another electronic control unit which is responsible for the at least partly automated lateral guidance of the vehicle to act in a suitable manner, i.e. to completely take over the lateral guidance or to merely give recommendations to the driver or to substantially comprehensively leave the lateral guidance of the vehicle to the driver. An electronic control unit which, in conjunction with a steering handle device according to the invention, brings about the described actions and does not have to be rigidly connected to the vehicle in any way is thus also the subject matter of the present invention, such as a computer program or computer program product which can be executed on an electronic control unit of this type, which in turn can be integrated for example in a mobile user device (such as a smartphone or the like).

In this context, a possible construction of a steering handle according to the invention will be described once again. Preferably, a component of a steering wheel or generally of a steering handle, which component is located further out and/or is easier for the driver to access can be decoupled from another part of the steering wheel or the steering handle. For example, for a steering wheel—as already mentioned further above—the steering wheel rim can thus be disconnected, in particular in a plurality of steps, decoupled or uncoupled, from what is known as the central steering wheel hub. However, it is also possible for only part of the steering wheel rim, thus for example when viewed in a cross section thereof, a segment thereof, to be uncoupable from a wheel angle actuator (in the most general form).

A decoupled steering handle or a decoupled part thereof or of the operating element for vehicle lateral guidance is then coupled again at least to a certain degree or completely to the wheel angle actuator, if required, in accordance with the criteria mentioned in the present description, in particular when a preset characteristic of a haptic contact between the driver (and in particular the driver's hand) and the steering handle (or the operating element or said operating element part) or a considerable increase in the haptic contact is determined. For example, such a characteristic can consist of the fact that the driver grips the steering handle with at least one hand (increasingly firmly) and/or squeezes and/or applies a specific torsional force to the steering wheel or the like. As soon as there is such a preset characteristic of a haptic contact, the steering handle or the part thereof which was previously uncoupled is connected either mechanically and/or electronically and/or for example electromagnetically ultimately, i.e. optionally with additional elements interposed, to the above-mentioned wheel angle actuator up to a certain degree (of the coupling—which will be described in greater detail later on) or completely.

Accordingly, a preferred embodiment of the present invention comprises a coupling device located anywhere between the steering handle and the wheel angle actuator, which is designed, starting from an uncoupled state, to produce an at least partly coupled state when a specific characteristic of the haptic contact is determined, and/or, starting from a coupled state, to produce an at least partly uncoupled state when no specific characteristic of the haptic contact is determined. For example, the coupling device can be shown together with the parts of the vehicle that transmit the steering moment, a wheel steer angle or information about the requested change in these variables from the first part of the operating element to a wheel angle actuator. Moreover, the wheel angle actuator can comprise for example an actuator of the vehicle which determines or controls desired steer angles of the front wheels and/or rear wheels of for example a passenger car (as a vehicle) relative to the chassis frame of the vehicle.

An existing coupling or coupling device (regardless of whether completely or only to a certain degree) can be opened at least partly or opened further (and thus decoupled at least partly or decoupled further) if it is determined for example by means of a sensor in the steering handle, such as a correspondingly set-up hands-on sensor, that the driver's hand is not resting on the steering handle, or the driver is not clasping the steering handle in accordance with predetermined criteria, thus for example is not clasping said handle extensively or firmly enough. It is thus ensured that the driver cannot turn the steering handle (for example the steering wheel), if they are not holding said handle/wheel with their hand, by an inadvertent movement (for example a leg movement) and cannot prevent a rotational movement if said movement has been triggered by an automatic lateral guidance device of the vehicle.

For example a steering wheel as a steering handle according to the invention, with which the driver has insufficient haptic contact or an insufficient characteristic thereof in particular with a palm of their hand, thus for example in the form of a sufficient gripping force, can then also simply "spin" substantially without influencing the wheel angle actuator. Even if the driver is not concentrating on the traffic situation in particular in the case of a partly or highly automated driving state and is touching their steering wheel at the sides in a relatively firm manner without clasping said wheel with the palm of their hand up to a certain extent, this still has no effect on the wheel angle actuator.

Starting from an above-described state, an at least partial or complete recoupling (i.e. functional reconnection) between the steering handle and the wheel angle actuator can take place according to additional preset criteria. In particular, it is noted that the particular characteristic of the haptic contact in which an at least partly (or completely) decoupled state is produced, can be different from the particular characteristic of the haptic contact in which an at least partly (or completely) coupled state between the steering handle and the wheel angle actuator is produced.

Furthermore, i.e. optionally also independently of the characteristic of the haptic contact, starting from an at least partly decoupled state, an at least partly coupled state can be produced, if it is determined for example by means of an electronic control and monitoring unit that automatic lateral guidance of the vehicle, for whatever reason, in particular for one of predefined reasons, is not possible. In this context, an emergency switching process is possible, as a result of which the driver must then take over the guidance of the vehicle themselves.

Furthermore, it should be explicitly mentioned that producing an at least partial coupling can also consist in the fact that the degree of the coupling is adapted in a suitable manner. A specific degree of coupling can consist for example in the fact that a coupling between the steering handle and the wheel angle actuator is only within a specific value range of a force or of a momentum which is then transmitted, or in that a coupling and thus a transmission of a displacement of the steering handle (or another driver operation by means of which the driver specifies unquestionably clearly a wish for lateral guidance of the vehicle on said operating element or operating element part) to the wheel angle actuator takes place only when a specific displacement path of the steering handle is exceeded or reached (in the case of a steering wheel, this would be a specific angle of rotation or angular rotation range).

With regard to the at least partial coupling or recoupling, such a process can take place for example when, for example by means of a steering handle sensor, for example the hands-on sensor which is set up for this purpose, it is detected that the driver's hand is in contact with or is laid on the steering handle, for example in that said handle is being sufficiently clasped, in accordance with predetermined criteria. In this case, in particular a detection of individual fingers of the hand can also take place. Preferably, in this case, a check can take place of whether a specific number of fingers of the driver's hand are gripping the steering wheel rim, in particular in an arc, at least in a specific arc angle or length.

After the coupling or at least partial connection of the steering handle to the wheel angle actuator, the driver can at least co-determine the lateral guidance of the vehicle—preferably, the degree of the interaction of the driver (only partial influence of the driver with a desired or preset degree of influence or substantially complete control by the driver) can also be dependent on the current characteristic of the haptic contact. Thus, a partly automated mode for the steering handle device is possible, in which an automatic lateral guidance system of the vehicle merely provides recommendations to the driver, specifically preferably again by means of the steering handle (for example by means of vibrations and/or small turning moments in the case of a steering wheel). A detection of haptic contact between the driver and their steering handle can thus be used for various degrees of automation in the interaction between an automatic lateral guidance system and the driver.

Coming back to the characteristic or the measurement of the haptic contact between the driver and the steering handle (or the operating element or operating element part), this can also be detected and taken into account differently for at least two different parts of the steering handle or said lateral guidance operating element. The measurement of the haptic contact can take place in this case by means of expediently set up sensors, for example a steering handle sensor. A steering handle sensor can be a sensor which is installed in a part of the steering handle, for example an expediently developed "hands-on sensor".

Depending on different characteristics of the haptic contact, said coupling between the steering handle and the wheel angle actuator can also be different, thus for example adjusted in accordance with preset, in particular differently customizable, adjustable or automatically learnable, mathematic functions. In particular, a cumulative measurement based on at least two or more measurements of the haptic contact can be taken into account. At least two different cumulative measurements can be predefined, which are each required for reaching different degrees of coupling between the steering handle (or the like) and the wheel angle actuator.

With regard to the just-mentioned different degrees of the coupling between the steering handle and the wheel angle actuator, in addition to a completely decoupled state, in which there is no connection at all between the steering handle and the wheel angle actuator, and a completely coupled state of the steering handle, in which only the driver sets the wheel steer angle by means of the steering handle, at least one intermediate state can be provided, in which a wheel steer angle can both be adjusted by the driver by means of the steering handle and also ultimately preset on the wheel angle actuator by a control unit which at least partly laterally automatically controls the vehicle. Said degree of the coupling between at least one part of the operating element and the wheel angle actuator can thus be controlled in at least two steps and/or continuously or almost continuously according to the measurement of the haptic contact, thus for example a specific pattern of the gripping of the operating element, between the driver and the operating element part. In this case, the degree of the coupling can take on different and for example adaptively controllable values, thus for example one of the following. In addition to a "substantial decoupling", a coupling only within certain limits or with certain constraints is also possible, thus for example until reaching a specific force or momentum limit, and/or within specific movement limits of the steering handle (in the case of a steering wheel having one or more angle limits), wherein on that side of the limits, no characteristic curve, or a characteristic curve changed in a specific manner, of the influence of the movement of the vehicle on a specification is implemented with regard to the steering handle. However, different degrees of the coupling between the steering handle and a wheel angle actuator can also be understood to mean a change in the transmission ratio (between a specific displacement of the steering handle and the associated wheel steer angle). In this case, different transmission ratios can apply for different rotational angle ranges (of a steering wheel) and/or the at least two different transmission ratios can also be adjusted according to one or more angle threshold values (of a steering wheel). (For steering handles which can be moved in different ways, instead of an angle, a corresponding size of a deflection or movement is to be set). Of course, different degrees (of the coupling) in small steps or steplessly are possible in this case. Thus, a device according to the invention can have at least one, preferably two or more degrees of coupling, which differ(s) from a substantially coupled and/or substantially decoupled state. The at least two such degrees of the coupling can differ from one another substantially, in particular fundamentally, both in terms of qualitative features, in particular logical relationships and/or in terms of the parameters of the coupling.

On a steering handle device according to the invention, said characteristic of the haptic contact can be a dimension and/or a pattern with respect to pressure or electrical capacitance or inductance of the haptic contact between at least one hand of the driver and the steering handle (or the at least one part of the operating element). In this case, the extent can be locally restricted, thus for example can be significant only over certain sub-surfaces of the steering handle and accordingly also detected only there, and/or said pattern can be a surface pattern. The patterns last mentioned by way of example can be for example a surface pattern and/or a temporal pattern, more specifically for example with respect to the pressure applied by one hand and/or two hands of the driver to the steering handle. Such patterns or pressure patterns can be detected for example by a capacitive or piezoelectric sensor in the steering handle, thus for example by means of a suitable development of a hands-on sensor which is known per se. Said sensor can be able to detect and in particular recognize or classify at least two-dimensional patterns as well. In this case, a detection of (individual) fingers can also take place. Preferably, the position of the fingers relative to the parts of the operating element can also be detected and taken into account. Particularly preferably, the change (for example a change in the measurement of the haptic contact) can also be detected and taken into account.

The detection of a two-dimensional pattern can take place in this case by means of a sensor mat installed in the steering wheel rim. In this case, a device according to the invention can also be configured to carry out an at least two-dimensional pattern recognition method, which can be used for example for image-processing methods which are known per se. In this case, the at least two-dimensional pattern recognition method can be applied to part of the surface of the steering wheel rim in such a way that the surface is mapped onto a two-dimensional face. The device can be configured with a three-dimensional pattern recognition method, wherein one of the dimensions represents a passage of time.

A dimension of the haptic contact between the driver of the vehicle and the steering handle can thus comprise a temporal and/or surface pattern composed of capacitively detected measured values which are generated by one hand and/or two hands of the driver on the steering handle of the vehicle. Of course, alternatively or additionally, an application of an inductive sensing principle is also possible. Additionally or alternatively, a camera system provided in the interior of the vehicle (image detection system) can be used to detect the measurement of the haptic contact between the driver's hands and the steering handle (or at least part of the operating element for vehicle lateral guidance) for example by means of optical object recognition.

For example (but explicitly not restricted thereto), on a steering handle device according to the invention and in particular when a complete decoupling is carried out, it can be provided that the steering handle or at least a part thereof can then be for example rigidly connected to a vehicle body (but not necessarily in a hard-latching manner) and thus cannot be displaced by the driver. A device according to the invention can thus be developed so that the degree of the coupling of a first or at least a second part of the operating element can be controlled relative to a fixed position in the coordinate system of the vehicle (for example relative to a part of the vehicle which is stationary in the coordinate system of the vehicle, in an obvious manner relative to the dashboard), wherein the second part of the lateral guidance operating element is preferably different from the first part of said operating element. In this context, it can also be provided that a degree of the coupling fixes at least one part of the steering handle with respect to the chassis of the vehicle to a certain extent. All the degrees of the coupling described in the present case can also be transmitted or applied to the coupling of the at least one part of the operating element relative to a fixed position in the coordinate system of the vehicle, e.g. relative to a part of the vehicle which is stationary in the coordinate system of the vehicle.

Without intending to restrict the present invention thereto, a steering wheel which is conventional in terms of the appearance thereof, for example only the steering wheel rim, can be rigidly connected to a chassis component (for example the dashboard) and thus to the vehicle body. The driver can then not influence the wheel angle actuator themselves, even if they were to inadvertently touch the steering wheel rim (as a steering handle) or for example turn said steering wheel rim by a movement of their legs. Advantageously, the driver can then for example support themselves on the steering wheel rim or use said rim in the manner of a support table. Alternatively or additionally, an inner, i.e. central portion of the steering wheel (or of a steering handle according to the invention) can of course also be rigidly connected to the vehicle body so that the steering wheel (or the steering handle or more general part of the lateral guidance operating element) which is decoupled from the wheel angle actuator in such a way, for example completely, can also be used variably as a fixed tray in the manner of a computer table for office work or the like.

In this case, together with the rest of the advantages of the invention, the advantage of better use of time for the driver of the at least partly automatically driving vehicle can also be achieved. In this case, the driver does not have to physically strain, for example to the side, in order to have a "support table" which is perfectly arranged in front of them or a surface for operating a screen.

In this context, a suitable mounting for example for user devices can be provided on the steering handle (in the broadest sense, that is to say on whatever part thereof) which, in an advantageous development, can comprise a device which, in the case of an airbag being triggered (as conventionally provided in the steering wheel of a passenger car), the user device or the above-mentioned mounting is for example cast off to the side. For the sake of completeness, it is explicitly mentioned once more that in this case as well—i.e. in the case of a coupling to a vehicle coordinate system, different degrees of the coupling are possible, as already explained further above.

According to one development of a steering handle device according to the invention, said degree of the coupling between the steering handle and the wheel angle actuator can be dependent on at least one additional constraint, thus for example on an actuation of an additional operating element (such as a pedal) by the driver. For example, a second condition for changing the degree of the coupling of the steering handle to the wheel angle actuator can comprise an action of the driver with an operating element for controlling the longitudinal guidance of the vehicle (such as an accelerator pedal or brake pedal), which action exceeds a preset measurement. Thus, as soon as the driver actuates one of their pedals, the degree of coupling between the (for example) steering wheel and the wheel angle actuator changes. For example, the steering wheel is coupled again at least in part, or more strongly than before, when the pressure on one of the pedals and/or the pedal angle reached exceeds a certain value. Moreover, in this case, a pedal can also be located or have been located (beforehand) in an at least partly decoupled state. It can be provided that an actuation of at least one pedal of the vehicle results in a change in the degree of coupling of the steering handle to the wheel angle actuator when the actuation of the pedal represents an intervention in the longitudinal guidance of the vehicle which exceeds a specific measurement and/or causes a change in the traffic situation, and/or brings about or can bring about a change in at least one lateral distance of the vehicle from a hazard, i.e. results in a certain probability of collision, and/or when it is no longer possible to perform an automated maneuver by means of an intervention by the driver.

Another example of an above-mentioned additional constraint can be a suitable automatic detection of a takeover wish and/or the takeover ability of the driver with respect to an in particular specific, for example imminent driving task, in particular the steering or lateral guidance of the vehicle. A device according to the invention can thus be configured to detect a takeover wish, in particular with respect to at least the lateral guidance and/or longitudinal guidance of the vehicle and/or a steering ability of the driver with respect to a (specific, in particular imminent) driving task, in particular in connection with the steering of the vehicle, and to control the degree of the coupling of said part of the operating element according to the detected measurement of the takeover wish and/or takeover ability, that is to say, according to such a detection, the degree of the coupling between the steering handle or the operating element and the wheel angle actuator can then be controlled. For example, for this purpose, an analysis of body gestures, such as a gesture for operating the steering wheel and/or a gesture for operating a pedal and/or a (rapid) body movement from a for example semi-recumbent posture to a driving-ready posture can be used. The takeover wish or ability can be determined in this case by means of an interior camera of the vehicle, for example when the detected hands of the driver move to or grasp the steering wheel. Analogously, for this purpose, the readiness of the driver to operate a pedal can be detected. A combination of such gesture detections is also possible. For example in the case of an inability to take over, a coupling can also be prevented or linked to additional preset conditions.

On a steering handle device according to the invention, a characteristic of the haptic contact which determines said degree of coupling can be dependent on a current or imminent driving maneuver of the vehicle. The device can thus be configured to determine a current or expected, at least partly performed driving maneuver and consequently apply different measurements, in particular threshold values for the measurement of the haptic contact as a prerequisite for a change in the degree of the coupling, thus for example a decoupling and/or a coupling between the steering handle and the wheel angle actuator. Depending on a currently present or predicated maneuver of the vehicle, a different measurement of the haptic contact for changing the degree of the coupling is assumed. A maneuver currently being carried out or a predicated, in particular planned maneuver can be determined in this case for example from an automated maneuver control, from what is known as path planning, and/or from the recognition of the driver's intention and/or from the recognition of the intention of other traffic participants.

Furthermore, a steering handle device according to the invention can be designed to change the haptic property thereof which can be felt by the driver according to said degree of the coupling. In a similar manner, the steering handle can transmit a haptic signal to the driver according to said degree of the coupling. The driver can thus be informed in an almost intuitive manner that the steering handle device changes the degree of the coupling and in what manner a current change is taking place. For example, for this purpose, a haptic profile, such as a roughness on the surface of the steering handle can be electronically controllable.

Before additional features and advantages are explained, it should be explicitly mentioned that, in the present case, although a steering handle device is extensively described, additionally or alternatively, an operating method for a steering handle which has at least one technical feature which is described in the present case is also disclosed and can be claimed.

In this case, a technical feature of this type is the detection of the characteristic or the measurement of a haptic contact between the driver and the steering handle (or the like) and optionally a suitable reaction thereto. This measurement of the haptic can preferably comprise a measurement of the contact area, in particular between the driver's hand (palm) and the steering wheel of the vehicle, and/or a pressure, in particular as the total pressing force and/or pressure distribution and/or pressure per unit of contact area and/or regions of the palm which (in a relevant time interval) have or are expected to have haptic contact with the steering handle, and/or the tension and/or position of one or more of the driver's fingers. In this case, such regions of the steering handle are preferably taken into account which (in the relevant time interval) should have or are expected to have haptic contact with the driver.

A measurement of the haptic contact can be described or represented in this case by a measurement of a capacitive and/or inductive value between the control element and the driver (of one or two palms of the driver). The measurement of the capacitive contact and/or inductive contact can thus be detected for example by means of a capacitive sensor integrated in a steering wheel of the vehicle and/or a steering wheel heating filament. Alternatively or additionally, the (physical) pressure or the pressure distribution of the hand (or palms) of the driver on the (manual) operating element for the lateral guidance of the vehicle can be detected.

In actual fact, the detection of the haptic contact can then be dependent on one or more pressure values and/or capacitance values or a change in the pressure values and/or capacitance values which are caused for example on the steering wheel of the vehicle by one or two hands of the driver. Preferably, the haptic contact is represented by one or more specific measurements. In this case, it is possible to differentiate between a light (almost powerless) touch of the steering handle by one hand or by two hands and a gripping of the steering handle by one or two hands of the driver and a pronounced force coupling between the one or two hands of the driver and the steering handle. Said force coupling can be represented by tight and/or extensive contact or a frictional force.

Furthermore, it is also possible to determine when there is no or insufficient haptic contact between one or both hands of the driver, in particular when said contact falls below a preset measurement (with respect to a sufficient transmission of the driver's wish) or when, to distinguish (specific) haptic driver information, there is insufficient haptic contact. As a measurement of the haptic contact between the driver of the vehicle and the steering handle, a measurement representing a capacitive coupling which is caused by one and/or two hands of the driver can be used. Furthermore, for this purpose, inductive sensing principles and alternatively or additionally a camera system in the interior of the vehicle can be used to detect said characteristic of the haptic contact.

For the driver, a steering handle device according to the invention provides a steering handle which is particularly comfortable, effective, easy to understand and in particular cannot be incorrectly operated unknowingly. In particular, the contradiction between an intervention which is overly strong in terms of force and an intervention which is overly weak in an automatic vehicle lateral guidance system can be resolved. Without having to fear disadvantageous consequences, the driver can completely trust in an automatic lateral guidance system of the vehicle, in particular since the probability of incorrect operation is considerably reduced. There is better selectivity for the driver depending on the driving situations, i.e. whether they want to control the vehicle themselves or want the vehicle to be controlled automatically. There is thus also a better choice of situations between many and few interventions either by the driver in the automatic lateral guidance or by an at least partly automatic lateral guidance system in the lateral guidance actions of the driver.

The invention further also comprises an electronic control unit which is configured to perform a substantial part of such an operating method or similar, in particular to determine the control signals. Such a control unit can be installed together with or separately from the steering handle and/or with an additional system of the vehicle, for example with the system for performing at least partly automated driving.

The invention further also comprises a computer program, in particular a computer program product comprising the computer program, wherein the computer program is designed to carry out, on a data processing device of a vehicle or of a mobile user device, part of the operating method according to the invention or an advantageous embodiment of the method according to one or more additional features of the operating method during the implementation of said method. In particular, the computer program is a software program which can be executed for example as an app (=application) on an electronic control device which is installed in or can be carried along with the vehicle. In this case, part of the control device can be a mobile user device.

The computer program or computer program product comprises an executable program code which, in the case of an implementation by a data processing device, implements at least part of the method according to an aspect described in the present case or an advantageous embodiment of the method described in the present case. In this case, the computer program product can be in the form of an update to a previous computer program, which, for example as part of a function extension, for example as part of what is known as a "remote software update", comprises the parts of the computer program or of the corresponding program code for a corresponding control device of the vehicle.

The steering handle device can be a device which is permanently installed in the vehicle, comprising the at least one electronic control unit and the at least one operating element which is designed as a steering handle, in particular a steering wheel, handlebars, etc. Furthermore, the device can also comprise one or more sensors of the vehicle or of a mobile user device which are designed to implement the method.

It should be noted that the methods, devices and systems described in this document can be used both alone and in combination with other methods, devices and systems described in this document. In addition, any aspects of the methods, devices and systems described in this document can be combined with one another in many different ways.

Other objects, advantages and novel features of the present invention will become apparent from the following detailed description of one or more preferred embodiments when considered in conjunction with the accompanying drawing.

BRIEF DESCRIPTION OF THE DRAWING

The single drawing FIGURE is a schematic view of a possible state diagram of a device according to the invention.

DETAILED DESCRIPTION OF THE DRAWING

In this case, in the ovals, various states of a device according to the invention which are labeled with letters (A, B, C, D, E) and described briefly in the following are shown, which represent different degrees of the coupling between a vehicle steering handle or a driver operating element for the lateral guidance of the vehicle and a wheel angle actuator of the vehicle (for example passenger car). In this example, the arrows T1, T2, T3, T4 in the drawing show briefly described transitions (state transitions) between the states A, B, C, D, E which (in principle) represent different degrees of the coupling. These state transitions are linked to preset conditions. In this case, this state diagram shown in the drawing (or a correspondingly designed state machine) is implemented when a condition T0 applies. In this example, such a condition T0 means that the vehicle, or the electronic control unit controlling automated lateral guidance of the vehicle, is ready to perform automated lateral guidance of the vehicle. A brief description follows of the states defined here by way of example and of the transitions with the conditions for the state transitions:

"A" represents a state in which at least a first part of the steering handle or of the lateral guidance operating element is substantially coupled to a wheel angle actuator of the vehicle so that there is almost conventional manual steering.

"B" represents a state in which a first part of the operating element or the steering handle is substantially decoupled or disconnected from the wheel angle actuator, i.e. in this case there can be for example fully automated steering.

"C" represents, as a possible intermediate state (between A and B) and thus as a possible degree of the coupling, a state in which a restriction angular range, which is a restricted rotational angular range of the steering handle or a wheel angular range within which a wheel angle can be set.

"D" represents a state in which a changed, expediently adapted degree of transmission, between the steer angle of the part of the operating element and a wheel angle actuator, is implemented in particular within and/or outside preset angle limits.

"E" is representative of additional possible degrees of said coupling.

The state transition T1 is implemented when it is determined that a measurement of the haptic contact between the driver and the steering handle, for example a gripping force on the steering handle is decreasing and/or has fallen below a first threshold, and/or when for example a preset haptic first pattern has not been detected anymore for example for a few seconds.

The state transition T2 is implemented when it is determined that a measurement of the haptic contact between the driver and the steering handle, i.e. when for example a gripping force on the steering handle is increasing and/or has exceeded a second threshold, and/or when the presence or the completion of a preset first haptic pattern has been detected.

The state transition T3 is implemented when it is determined that a measurement of the haptic contact between the driver and the steering handle, i.e. when for example a gripping force on the steering handle is (further) decreasing and/or has fallen below a third threshold, and/or when for example a preset second haptic pattern has not been detected anymore for example for a few seconds.

The state transition T4 is implemented when it is determined that a measurement of the haptic contact between the driver and the steering handle, i.e. when for example a gripping force on the steering handle is exceeding and/or has exceeded a fourth threshold, and/or when the presence or the completion of a preset second haptic pattern has been detected.

The state transition T5 is implemented when it is determined that a present current traffic situation cannot be automatically triggered or cannot be automatically triggered sufficiently, and/or when the driver performs an operating action on another operating unit such as a pedal, and/or if a haptic contact is determined on the steering handle, for example the gripping force thereof has exceeded a particularly high fifth threshold, or wherein a preset third haptic pattern has been detected.

In the state diagram, the state transition T5 is shown with regard to a transition from the state B to the state A. The same or similar state transitions can also be provided from each of the other states. In this case, the driver and/or an automated lateral guidance of the vehicle can prompt a return to a substantially coupled state, for example to the state A.

In the state diagram shown by way of example in the drawing, the degrees of the coupling are shown only incompletely and in a simplified manner. Deviating from this representation, a continuous transition between the degrees of the coupling is also possible. The degree of the coupling, in particular angle limits or angular ranges within the coupling states can also be adapted according to the detection of patterns and/or in accordance with additional preset conditions. Preferably, furthermore, an almost immediate coupling and/or decoupling (not shown in the diagram) of the steering wheel can also be achieved from each of the states in accordance with additional preset conditions, for example when there is an error in the automated lateral guidance and/or a serious mistake by the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlling a vehicle which is drivable in an at least partly automated manner, comprising:
    an operating element which is operatable by a driver to control at least lateral guidance of the vehicle; and
    a wheel-angle actuator which, controlled by the operating element of the driver and/or by an electronic control unit controlling automated lateral guidance of the vehicle, controls a steer angle on steerable wheels of the vehicle,
    wherein a degree of coupling between at least one first part of the operating element and the wheel-angle actuator of the vehicle and/or between at least one first part of the operating element and a fixed position in a coordinate system of the vehicle, is changeable according to measurement of haptic contact of the driver of the vehicle with said first part of the operating element.

2. The device as claimed in claim 1, wherein an electronic control unit opens the coupling at least in part and thus decreases the degree of the coupling when the measurement of said haptic contact decreases.

3. The device as claimed in claim 2, wherein an electronic control unit closes the coupling at least in part and thus increases the degree of the coupling when the measurement of said haptic contact increases.

4. The device as claimed in claim 1, wherein an electronic control unit closes the coupling at least in part and thus increases the degree of the coupling when the measurement of said haptic contact increases.

5. The device as claimed in claim 1, wherein the degree of the coupling between at least one part of the operating element and the wheel-angle actuator is changeable in at least two steps, continuously, or almost continuously according to the measurement of the haptic contact.

6. The device as claimed in claim 1, wherein the measurement of the haptic contact between the driver and the operating element includes a pattern of the haptic contact based on pressure that is applied to the operating element by at least one hand of the driver.

7. The device as claimed in claim 1, wherein the measurement of the haptic contact between the driver and the operating element includes a pattern of the haptic contact based a surface pattern composed of capacitively detected measurement values.

8. The device as claimed in claim 1, wherein the degree of the coupling of at least one second part of the operating element relative to a fixed position in the coordinate system of the vehicle is controlled or can be set, and wherein the second part is different from the first part.

9. The device as claimed in claim 1, wherein a change in the degree of the coupling of the operating element or part thereof is dependent on an action, exceeding a preset measurement, of the driver on another operating unit for guiding the vehicle.

10. The device as claimed in claim 1, wherein the device is configured to detect that the driver has a takeover wish and/or is able to steer in relation to a driving task, and to control the degree of the coupling of at least one part of the operating element according to the detected measurement of the wish to take over and/or of the ability to take over.

11. The device as claimed in claim 1, wherein the device is configured to identify an automatic maneuver that is currently being carried out or is expected to be performed at least in part and consequently apply different measurements of the haptic contact as a prerequisite for a change in the degree of the coupling.

12. The device as claimed in claim 1, wherein the device is configured to output at least one haptic signal to at least one part of the operating element in connection with a change in the degree of the coupling and/or to change at least one haptic property of at least one part of the operating element in connection with the current degree of the coupling.

13. An electronic control unit, comprising:
    a control unit operatively configured to operate a device for controlling a vehicle which is drivable in an at least partly automated manner, the device comprising:
        an operating element which is operatable by a driver to control at least lateral guidance of the vehicle; and a wheel-angle actuator which, controlled by the operating element of the driver and/or by an electronic control unit controlling automated lateral guidance of the vehicle, controls a steer angle on steerable wheels of the vehicle, wherein a degree of coupling between at least one first part of the operating element and the wheel-angle actuator of the vehicle and/or between at least one first part of the operating element and a fixed position in a coordinate system of the vehicle, is changeable according to measurement of haptic contact of the driver of the vehicle with said first part of the operating element.

\* \* \* \* \*